(12) United States Patent
Stoesz

(10) Patent No.: US 7,958,785 B2
(45) Date of Patent: Jun. 14, 2011

(54) SENSORY TRANSDUCER AND METHOD

(75) Inventor: Carl W. Stoesz, Houston, TX (US)

(73) Assignee: Baker Hughes Incorporated, Houston, TX (US)

( * ) Notice: Subject to any disclaimer, the term of this patent is extended or adjusted under 35 U.S.C. 154(b) by 31 days.

(21) Appl. No.: 12/479,122

(22) Filed: Jun. 5, 2009

(65) Prior Publication Data

US 2010/0307256 A1  Dec. 9, 2010

(51) Int. Cl.
*G01L 7/06* (2006.01)
(52) U.S. Cl. .................................... 73/729.1
(58) Field of Classification Search .................. None
See application file for complete search history.

(56) References Cited

U.S. PATENT DOCUMENTS

| | | | |
|---|---|---|---|
| 6,337,737 B1 * | 1/2002 | Chang et al. | 356/32 |
| 6,740,866 B1 | 5/2004 | Bohnert et al. | |
| 6,898,339 B2 | 5/2005 | Shah et al. | |
| 7,266,261 B2 | 9/2007 | Arias Vidal et al. | |
| 2002/0194917 A1 * | 12/2002 | Fernald et al. | 73/705 |
| 2004/0129083 A1 * | 7/2004 | Fernald et al. | 73/705 |
| 2006/0034559 A1 * | 2/2006 | Arias Vidal et al. | 385/13 |
| 2006/0062510 A1 | 3/2006 | Vidal et al. | |
| 2006/0104561 A1 * | 5/2006 | Ivtsenkov | 385/13 |

OTHER PUBLICATIONS

Chang, I-nan et al. "Magnetic microsensor with temperature compensation based on optical mechatronic technology" [Abstract Only], Graduate Institute of Automatic Control Engineering, Aug. 25, 2009.
A. Koch, C. Helmig, and H. Senftlben, "Experimental Studies on a Temperature Compensation for Optical Voltage Sensing" [Abstract Only], in Optical Fiber Sensors, OSA Technical Digest Series, Optical Society of America, Oct. 28, 1997.
International Search Report; Date of Mailing Jan. 28, 2011; International Appln No. PCT/US2010/037262; Korean Intellectual Property Office; 3 pages.

* cited by examiner

*Primary Examiner* — Andre J Allen
(74) *Attorney, Agent, or Firm* — Cantor Colburn LLP

(57) ABSTRACT

A transducer including a housing; one or more pressure communicating configurations disposed within the housing; one or more selected pressure chambers in operable communication with the one or more pressure communicating configurations; an environmental chamber in operable communication with one or more of the one or more pressure communicating configurations; and a strain member secured to one or more of the one or more pressure communicating configurations and method.

24 Claims, 2 Drawing Sheets

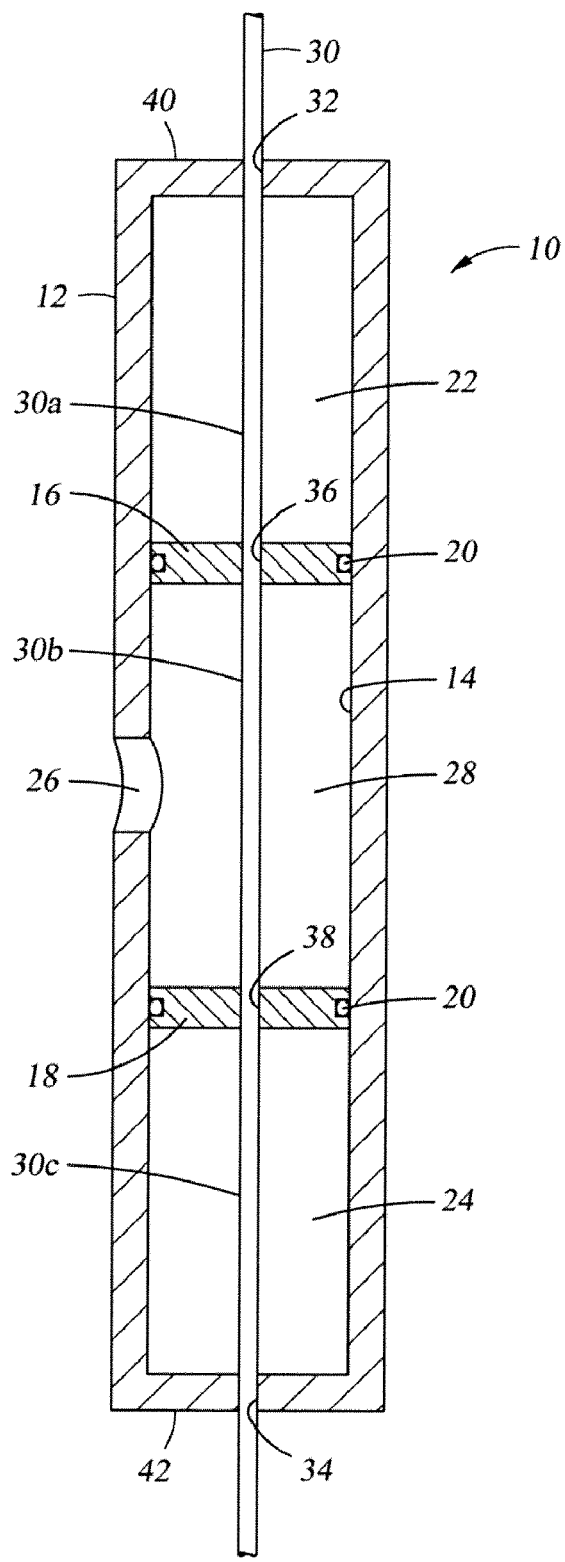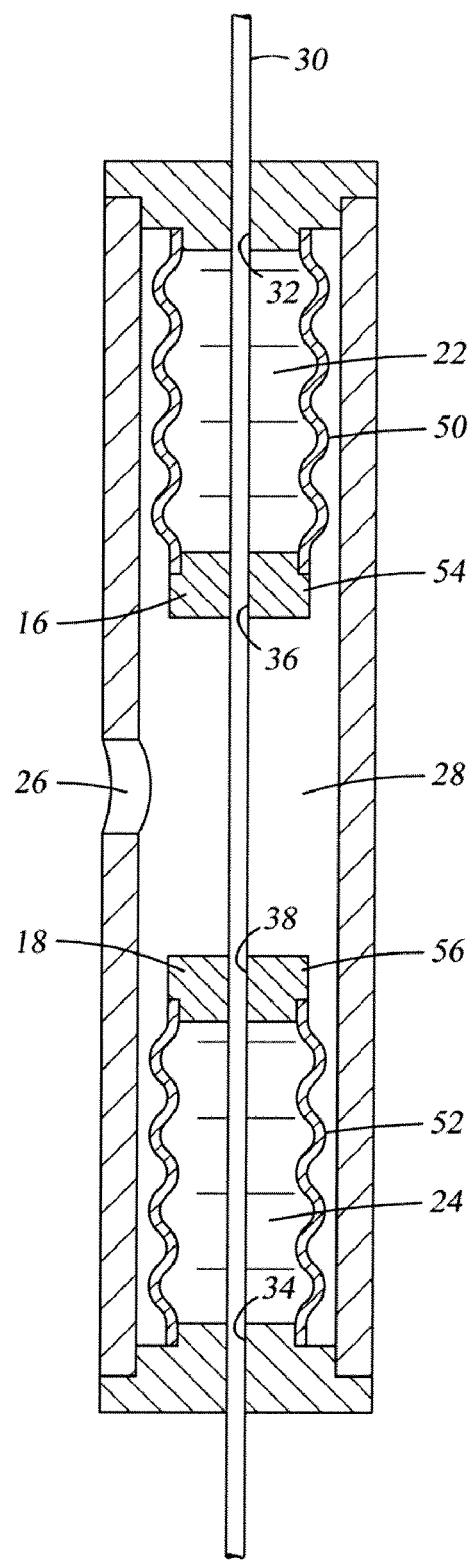
Fig. 1
Fig. 2

SENSORY TRANSDUCER AND METHOD

BACKGROUND

Measurement using strain sensitive members such as optic fibers having Bragg gratings therein is ubiquitously used in many industries. Using Bragg gratings written to the fiber enables sensitivity to for example, axial strain in the fiber. This can be "visible" to an operator at a remote location thereby providing information about strain in a fiber that otherwise would be difficult to query.

Larger strain magnitudes, providing they are not greater than can be withstood by the fiber, are relatively easy to measure. Microstrain however can be harder to resolve. This can be especially true in industries where the measurement is a significant distance away from the operator. Telecommunications and downhole operations are but two possible industries where the distances become large and sensitivity can become an issue.

While Fiber Bragg Gratings (FBG) used in the current state of the art have contributed significantly to a wide range of industries, improvement is always desired.

SUMMARY

A transducer including a housing; one or more pressure communicating configurations disposed within the housing; one or more selected pressure chambers in operable communication with the one or more pressure communicating configurations; an environmental chamber in operable communication with one or more of the one or more pressure communicating configurations; and a strain member secured to one or more of the one or more pressure communicating configurations.

A method for measuring a parameter including exposing a strain member configured to experience a compression in a portion thereof and simultaneously experience tension in an adjacent section thereof, to an environment having a parameter to measure; perceiving a differential between the tension and compression within the strain member; and resolving a property of the parameter using the differential strain.

BRIEF DESCRIPTION OF THE DRAWINGS

Referring now to the drawings wherein like elements are numbered alike in the several Figures:

FIG. 1 is a schematic illustration of a transducer in accordance with the teaching herein;

FIG. 2 is an alternate embodiment of a transducer in accordance with the teaching herein.

DETAILED DESCRIPTION

Figure 3:
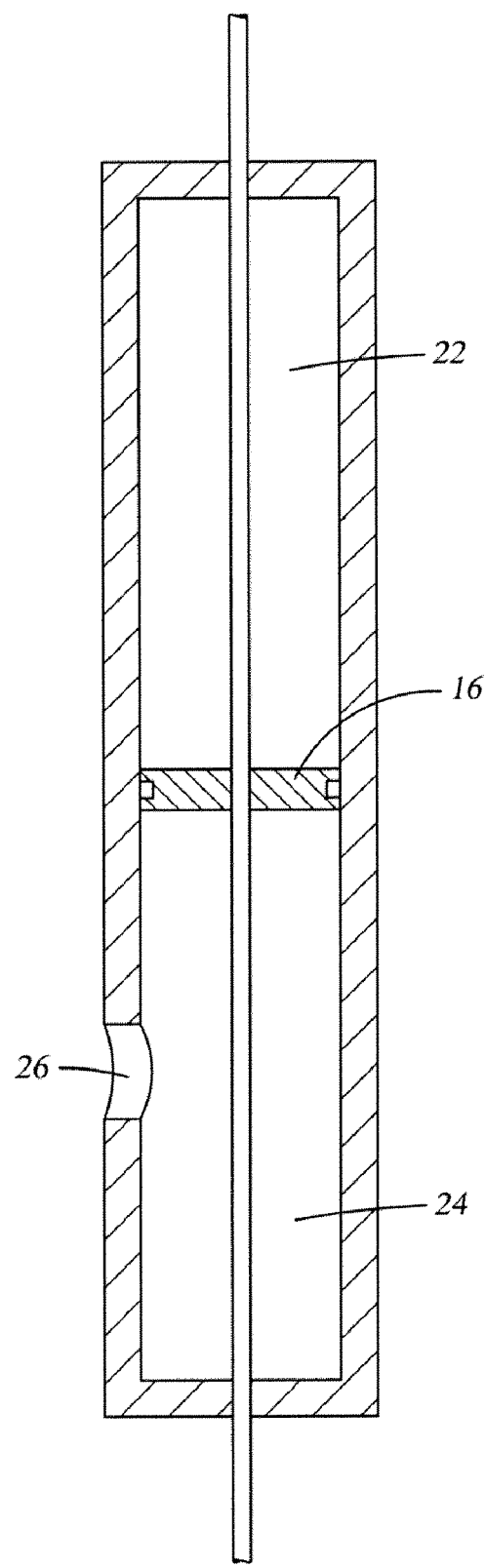
FIG. 3 is another alternate embodiment of a transducer in accordance with the teaching herein.

Referring to FIG. 1, a transducer 10 is illustrated schematically. The transducer 10 comprises a housing 12 such as a capillary tube constructed of metal or other durable material including polymers having properties enabling them to withstand the environment in which the transducer is intended to be used. In one embodiment, the transducer will be used in a downhole environment, in which case the ability to withstand high temperature and a caustic environment is desirable, for example.

The housing 12 includes one or more pressure communicating configurations 16 and 18 that in this embodiment are illustrated as pistons 16 and 18. It will be appreciated that other configurations can be substituted in other embodiments, some of which are described below.

In the first illustrated embodiment, FIG. 1, the housing 12 provides a smooth seal surface 14 on an inside surface thereof to interact in a pressure-sealing manner with pistons 16 and 18. The pistons 16 and 18 may include a seal 20 such as an o-ring. Each piston 16, 18 segregates one or more selected pressure chambers, (shown as two) 22 and 24, respectively having one or more selected pressures. In one embodiment, the selected pressure is atmospheric pressure. The pistons are free to move within the housing 12 based upon a pressure differential thereacross that is occasioned by an exposure opening 26 that introduces whatever environmental pressure there is in the location where the transducer 10 is placed to environmental pressure chamber 28. The transducer will experience piston movement away from the opening 26 as it moves into pressure regimes that are higher than the selected pressure, or toward the opening 26 if the transducer is exposed to pressures lower than the selected pressure.

Further illustrated is a strain member 30 that in one embodiment is a capillary tube. In one embodiment, one or more FBG optic fibers will be placed and affixed (for example, by epoxy, ceramic adhesives, or fine cements) within the member 30. Placement and/or affixation of the one or more fibers can be done at any time but is often done after other work related to the transducer, that might include welding, etc., is finished to avoid heat related damage to the one or more fibers.

The member 30 passes through the housing 12 at securements 32 and 34 where it is secured thereto and passes through pistons 16 and 18 at securements 36 and 38, respectively. The member 30 is further secured at these locations. Securement is effected by welding, brazing, adhesive, clamping, etc., for example, although other methods of securement are acceptable providing the member does not translate relative to these securements 32, 34, 36, 38 but rather allows the transducer to place a strain on the member 30 in tension or compression as discussed below. It is to be understood that with securements 32, 34, 36, 38 the member 30 is effectively segregated into sections within the housing 12, the sections are identified as 30a, 30b and 30c in FIG. 1. Because the pistons 16, 18 can move, the axial strain in the member 30 in each of sections 30a, 30b and 30c will change pursuant to ambient pressure communicated to chamber 28 through opening 26. Where that pressure is greater than the selected pressure, chamber 28 will grow in axial length by translating pistons 16 and 18 toward respective ends 40 and 42 of housing 12, whereas if pressure communicated to environmental pressure chamber 28 through opening 26 is less than the selected pressure the pistons 16 and 18 will translate closer to one another and away from respective ends 40 and 42. Because the member 30 is not permitted to move due to securements 32, 34, 36, 38 while the pistons 16 and 18 can, the translation of the pistons 16/18 causes the member section 30b to experience tension or compression while the member sections 30a and 30c will experience the opposite with respect to tension or compression. Since in use, the member 30, in one embodiment will contain one or more fibers affixed therein, the one or more fibers will similarly experience a compression or tensile strain. It is to be understood however that the member 30 can actually be one or more optic fibers with a securement at 32, 34, 36, 38 using a metallization and soldering technique known to be capable of securing fiber.

By effecting both tension and compression in the transducer 10, the transducer facilitates a greater sensitivity/resolution level than heretofore possible due to the "magnifying" effect of differential strain. More specifically, if for example, the environmental chamber 28 is subjected to a greater than the selected pressure, the pistons 16 and 18 will move toward ends 40 and 42, respectively, and thereby will cause the member section 30b to be put under a tensile strain; sections 30a and 30c will be put in compression having a magnitude that is the inverse of the tension experienced by section 30b (assuming a 1:1 length ratio). In one example, the percentage change in length of section 30b is +1 percent; the percentage change in 30a and 30c is also 1 percent but with a negative (−) sign since the change is in compression. If one uses both of these changes the differential change in length is 2 percent. This is easier to perceive than 1 percent and accordingly enhances sensitivity/resolution of the system. The differential remains regardless of the percentage change in length with the resultant change readable being twice the amount of a traditional fiber system, assuming an embodiment that uses a 1:1 ratio. The transducer 10 provides for greater sensitivity in measurement across all measurable ranges. Further the concept works where the pressure change is greater (e.g. downhole) or lesser (e.g. outer space).

It is possible to construct the transducer 10 with uneven length chambers to create a ratio of other than 1:1 for some particular applications that might benefit therefrom.

In an alternate embodiment that is illustrated substantially identically to FIG. 1 (and therefore FIG. 1 is used again), the pressure communicating configurations 16 and 18 will not be movable but rather will be flexible diaphragms that are affixed to the surface 14 (in which case the surface 14 need not be a smooth seal surface). Diaphragms 16 and 18 may be of any material that can withstand the conditions in the intended environment of use and have flexibility sufficient to allow use as a differential strain creating configuration. This may include metal, plastic, rubber, elastomeric compositions (monomers or polymers), etc. For understanding, the seals 20 illustrated in FIG. 1 are here identified as weld joints or other similarly functioning affixations. While these components no longer actually translate, they perform an identical function due to their flexibility by communicating a tensile or compressive load to the member 30 through deflection. In other respects the embodiment behaves identically to that of the above-described embodiment.

In another embodiment, referring to FIG. 2, the pressure communicating configurations 16 and 18 are in the form of a bellows driven arrangement. Each configuration 16 and 18 includes a bellows, illustrated as 50 and 52 and in one iteration a cap 54 and 56. It is further contemplated that a bellows alone be used and simply connected directly to the member 30 without the intermediary of a cap. Because the bellows 50 and 52 can collapse or expand dependent upon pressure in environmental pressure chamber 28 relative to pressure in chambers 22 and 24, the embodiment creates the same differential strain, as does each of the foregoing embodiments. In all other respects this embodiment is as described above and hence carries identical numerals.

In another embodiment, referring to FIG. 3, it will be appreciated that only part of the embodiment of FIG. 1 is represented. This embodiment works similarly to the FIG. 1 embodiment in that the pressure communicating configuration 16 acts in the same manner and there is a selected pressure chamber 22 and an environmental chamber 28. It is to be appreciated that in this embodiment, pistons, bellows, or diaphragms could be used. In addition, there is still a 1:1 tension: compression ratio and hence the capability of providing a differential strain measurement. The distinction is that the magnitude of the differential strain is less, and as shown, would be half that of the FIG. 1 embodiment because the effective piston area (regardless of whether the pressure communicating configuration is a piston, a bellows, diaphragm, etc.) is less than what it is in FIG. 1. This can be adjusted by building a transducer with different piston areas if a particular application would be considered well served in that way.

While one or more embodiments have been shown and described, modifications and substitutions may be made thereto without departing from the spirit and scope of the invention. Accordingly, it is to be understood that the present invention has been described by way of illustrations and not limitation.

The invention claimed is:

1. A transducer comprising:
    a housing;
    one or more pressure communicating configurations disposed within the housing;
    one or more selected pressure chambers in operable communication with the one or more pressure communicating configurations;
    an environmental chamber in operable communication with one or more of the one or more pressure communicating configurations; and
    a strain member secured to one or more of the one or more pressure communicating configurations.

2. A Transducer as claimed in claim 1 wherein the housing is a tube having an opening therein to communicate environmental pressure to the environmental chamber.

3. A Transducer as claimed in claim 1 wherein the housing is a capillary tube.

4. A Transducer as claimed in claim 1 wherein the one or more pressure communicating configurations is one or more pistons.

5. A Transducer as claimed in claim 4 wherein one or more of the one or more pistons are in pressure sealing communication with the housing.

6. A Transducer as claimed in claim 4 wherein one or more of the one or more pistons includes a seal.

7. A Transducer as claimed in claim 1 wherein the one or more pressure communicating configurations is one or more bellows arrangements.

8. A Transducer as claimed in claim 7 wherein one or more of the one or more bellows arrangements includes a cap.

9. A Transducer as claimed in claim 8 wherein the cap is secured to the strain member.

10. A Transducer as claimed in claim 1 wherein the one or more pressure communicating configurations are one or more diaphragms.

11. A Transducer as claimed in claim 10 wherein one or more of the one or more diaphragms comprise metal.

12. A Transducer as claimed in claim 10 wherein one or more of the one or more diaphragms comprise plastic.

13. A Transducer as claimed in claim 10 wherein one or more of the one or more diaphragms comprise rubber.

14. A Transducer as claimed in claim 10 wherein one or more of the one or more diaphragms comprise elastomer.

15. A Transducer as claimed in claim 1 wherein one or more of the one or more pressure communicating configurations are in sliding engagement with the housing.

16. A Transducer as claimed in claim 1 wherein one or more of the one or more pressure communicating configurations are affixed to the housing.

17. A Transducer as claimed in claim 1 wherein the strain member is a tube.

18. A Transducer as claimed in claim 17 wherein the tube contains one or more optic fibers therein.

19. A Transducer as claimed in claim 1 wherein the strain member is one or more optic fibers.

20. A Transducer as claimed in claim 1 wherein one or more of the one or more pressure communicating configurations simultaneously causes compression and tension in adjacent sections of the strain member.

21. A Transducer as claimed in claim 20 wherein the tension and compression is 1:1.

22. A Transducer as claimed in claim 1 wherein the housing includes at least one closed end and the strain member is secured to that end.

23. A method for measuring a parameter comprising:
 exposing a strain member configured to experience a compression in a portion thereof and simultaneously experience tension in an adjacent section thereof, to an environment having a parameter to measure;
 perceiving a differential between the tension and compression within the strain member; and
 resolving a property of the parameter using the differential strain.

24. A method as claimed in claim 23 wherein the tension and compression is 1:1.

* * * * *